United States Patent
Young et al.

(10) Patent No.: US 12,466,412 B2
(45) Date of Patent: Nov. 11, 2025

(54) YAW RATE SENSOR BIAS ESTIMATION

(71) Applicant: Arriver Software, LLC, Novi, MI (US)

(72) Inventors: William Jay Young, Rochester, MI (US); Amol Rajendra Birhade, Jersey City, NJ (US); Jason Gregory Pickel, Farmington Hills, MI (US); Jose Carlos Zavala-Jurado, Brighton, MI (US); Yimeng Dong, Northville, MI (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 18/363,498

(22) Filed: Aug. 1, 2023

(65) Prior Publication Data
US 2024/0043017 A1 Feb. 8, 2024

Related U.S. Application Data

(60) Provisional application No. 63/395,495, filed on Aug. 5, 2022.

(51) Int. Cl.
*B60W 40/114* (2012.01)
*B60W 60/00* (2020.01)

(52) U.S. Cl.
CPC ...... *B60W 40/114* (2013.01); *B60W 60/0015* (2020.02); *B60W 2420/403* (2013.01); *B60W 2520/14* (2013.01)

(58) Field of Classification Search
CPC ..... B60W 40/114; B60W 60/00; B60W 50/02
See application file for complete search history.

(56) References Cited

U.S. PATENT DOCUMENTS

| | | | |
|---|---|---|---|
| 6,198,988 B1 * | 3/2001 | Tseng | B60T 8/885 701/72 |
| 2003/0042790 A1 * | 3/2003 | Amberkar | B62D 7/159 303/140 |
| 2009/0265054 A1 * | 10/2009 | Basnayake | B60W 40/114 701/31.4 |
| 2013/0231825 A1 * | 9/2013 | Chundrlik, Jr. | B60W 30/12 701/29.1 |
| 2014/0163808 A1 | 6/2014 | Seo et al. | |
| 2016/0244069 A1 * | 8/2016 | Bajpai | B60W 40/114 |
| 2017/0297562 A1 | 10/2017 | Chen et al. | |
| 2020/0339134 A1 | 10/2020 | Pennala et al. | |
| 2022/0089165 A1 * | 3/2022 | Lee | B60W 40/11 |
| 2022/0194469 A1 | 6/2022 | Atmeh et al. | |
| 2024/0175716 A1 * | 5/2024 | Ghadieh | G01C 19/00 |

FOREIGN PATENT DOCUMENTS

JP 2020083236 A 6/2020

OTHER PUBLICATIONS

International Search Report and Written Opinion—PCT/US2023/029300—ISA/EPO—Oct. 13, 2023.

* cited by examiner

*Primary Examiner* — Tan Q Nguyen
(74) *Attorney, Agent, or Firm* — SUNSTEIN LLP

(57) ABSTRACT

An example yaw rate related method includes: obtaining a plurality of measurements of yaw rate of a vehicle from a yaw rate sensor; and determining a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary.

24 Claims, 7 Drawing Sheets

YAW RATE SENSOR BIAS ESTIMATION

CROSS-REFERENCE TO RELATED APPLICATIONS

This application claims the benefit of U.S. Provisional Application No. 63/395,495, filed Aug. 5, 2022, entitled "YAW RATE SENSOR BIAS ESTIMATION," which is assigned to the assignee hereof, and the entire contents of which are hereby incorporated herein by reference for all purposes.

BACKGROUND

Field of Disclosure

The field of the disclosure is yaw rate sensors and more particularly to yaw rate sensor bias estimation.

Description of Related Art

Autonomous vehicles (also known as self-driving vehicles) are becoming more popular. The potential for reduced vehicle collisions, improved traffic flow efficiency, increased vehicle efficiency (e.g., miles per gallon of gasoline, miles per kilowatt of electricity, etc.), increased user efficiency (e.g., freeing a would-be driver to perform other tasks while in transit), etc. is pushing demand for autonomous vehicles. In order to gain approval and acceptance of autonomous vehicles, vehicle designers and manufacturers are working to address numerous considerations (especially safety considerations) so that autonomous vehicles can have acceptable performance, e.g., acceptable collision avoidance.

Accurate data from sensors of autonomous vehicles helps ensure that decisions based on the data will be good and/or that actions based on the data will be acceptable. For example, accurate yaw rate data may help ensure that a blind stop may be performed without leaving a lane in which an autonomous vehicle is moving when the blind stop is initiated. A blind stop is a stop of a vehicle without the assistance of normally-available data due to a failure, e.g., without image data from a forward-facing camera of an autonomous vehicle. Because yaw rate sensors inherently have a bias (e.g., due to manufacturing tolerances, environmental conditions (e.g., temperature), etc.), and because that bias changes over time, it is desirable to update a bias estimate to determine a true yaw rate estimate.

SUMMARY

An example yaw rate related method includes: obtaining a plurality of measurements of yaw rate of a vehicle from a yaw rate sensor; and determining a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary.

An example device includes: one or more memories; and one or more processors communicatively coupled to the one or more memories and configured to: obtain a plurality of measurements of yaw rate of a vehicle from a yaw rate sensor; and determine a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary.

Another example device includes: means for obtaining a plurality of measurements of yaw rate of a vehicle from a yaw rate sensor; and means for determining a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary.

An example non-transitory, processor-readable storage medium includes processor-readable instructions to cause one or more processors to: obtain a plurality of measurements of yaw rate of a vehicle from a yaw rate sensor; and determine a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary.

DETAILED DESCRIPTION

Figure 1:
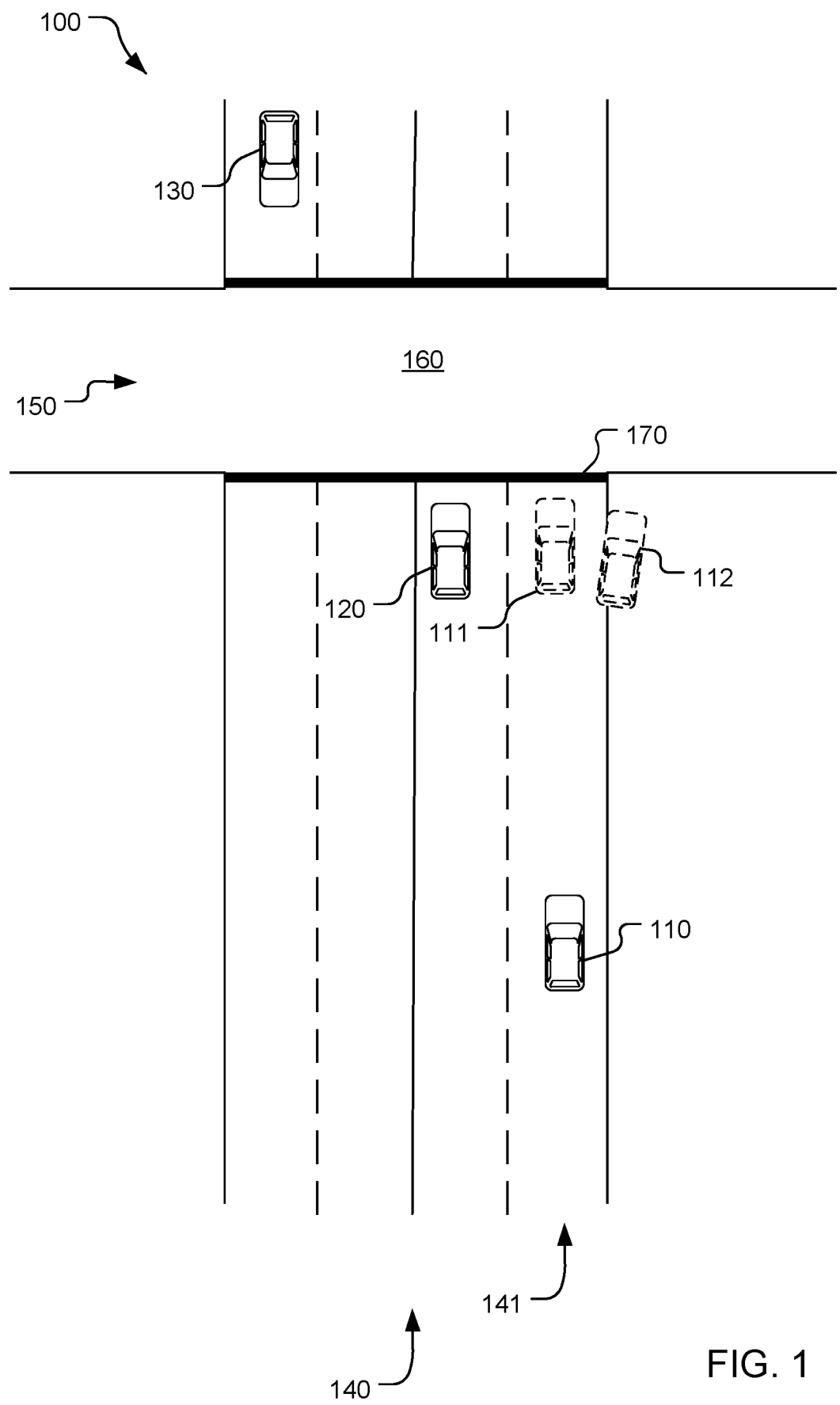
FIG. 1 is an example of a simple driving environment.

Techniques are discussed herein for estimating yaw rate sensor bias and usage thereof. For example, straight-line driving may be detected using a GNSS (Global Navigation Satellite System) receiver of a mobile apparatus (e.g., an autonomous vehicle) and/or the mobile apparatus being stationary may be detected. Detection of straight-line driving or stationary status may be used to trigger usage of a present yaw rate measurement (or a combination (e.g., average) of recent yaw rate measurements) as an estimated yaw rate sensor bias. The present yaw rate measurement may be used as the estimated yaw rate only if the GNSS sensor (receiver) and a yaw rate sensor agree that the autonomous vehicle is (or was) driving straight, or a standstill (stationary) condition is satisfied. The estimated yaw rate bias may be removed from yaw rate sensor measurements to determine estimated true yaw rate. The estimated true yaw rate may be used for one or more purposes such as guiding an autonomous vehicle while performing a blind stop where the vehicle is stopped due to a failure within a system, e.g., loss of camera data. Other configurations, however, may be used.

Yaw rate sensors include a time-varying error called bias in output of the yaw rate sensors and this error may be accounted for before using the yaw rate in an automobile. Additionally, the yaw rate bias changes over time so an initial estimate of the bias may become stale over time. Traditional bias estimator algorithms are based on the principle that bias should be zero when the vehicle is at a standstill or driving straight. For non-stationary conditions of the vehicle, these algorithms assume that the vehicle is driving straight when the current reading of the yaw rate sensor is within a margin of the earlier bias estimate. These algorithms update the value of the bias estimate when such an assumption is true. This process is repeated periodically. The assumption that the vehicle is driving straight may, however, be incorrect. For example, when the actual yaw rate changes slowly, the bias estimate can be steered to an arbitrary value. Techniques discussed herein may use positioning data (e.g., Satellite Positioning System (SPS) data) in conjunction with yaw rate sensor data to determine if the vehicle is driving straight. If both systems sufficiently agree that the vehicle is driving straight, then the bias estimate may be updated. The bias estimate may be subtracted from the yaw rate sensor data to get a true yaw rate.

Items and/or techniques described herein may provide one or more of the following capabilities, as well as other capabilities not mentioned. Yaw rate sensor bias may be determined more accurately than with prior techniques. Estimating yaw rate sensor bias using yaw rate sensor measurements during non-zero true yaw rate may be avoided. Inaccurate yaw rate sensor bias estimations due to small, consistent, non-zero yaw rate measurements may be avoided. Trustworthiness of yaw rate sensor bias compensation may be assessed and/or improved. Other capabilities may be provided and not every implementation according to the disclosure must provide any, let alone all, of the capabilities discussed.

The discussion herein may focus on determining a yaw rate estimate for use in performing a blind stop for an autonomous vehicle. This is an example to help illustrate concepts of the disclosure. The disclosure herein, including the claims unless specifically indicated otherwise, applies to other example implementations, e.g., uses other than blind stopping, uses for blind stopping (and/or other functions) for various types of vehicles.

Referring to FIG. 1, a driving environment 100 includes vehicles 110, 120, 130 disposed on a road 140 that intersects with another road 150 at an intersection 160. The vehicle 110 may be an autonomous vehicle, capable of self-driving (i.e., without human input) as well as being capable of manual driving (i.e., with human input). As part of autonomous driving, it may be desirable to stop the vehicle 110 without use of camera images, i.e., performing a blind stop, e.g., if camera images are unavailable (e.g., because a forward-facing camera of the vehicle is inoperable presently, etc.). To perform a blind stop safely, the true yaw rate of the vehicle 110 should be known accurately, e.g., such that any deviations from straight driving within a lane 141 in which the vehicle resides when the stopping is initiated can be accounted for, and compensated as appropriate to keep the vehicle within the lane 141 until the vehicle 110 is stopped. For example, with accurately estimated true yaw rate of the vehicle 110, the vehicle 110 may be blind stopped at a vehicle location 111 that is within the lane 141, e.g., at or before a stop line 170 demarcating an edge of the intersection 160. Without accurately estimated true yaw rate of the vehicle 110, blind stopping of the vehicle 110 may result in the vehicle leaving the lane 141, e.g., coming to rest at a vehicle location that is partially or fully out of the lane 141, e.g., in an adjacent lane of traffic, in an opposing lane of traffic, on a sidewalk (as shown by a vehicle position 112), etc. The vehicle 110 is a car but other implementations of vehicles may be used, in other driving environments and/or other types of environments. Various surface-based vehicles may be used (e.g., ground-based vehicles such as automobiles (e.g., cars, trucks, motorcycles, etc.) and/or water-based vehicles such as boats, jet skis, etc.).

Figure 2:
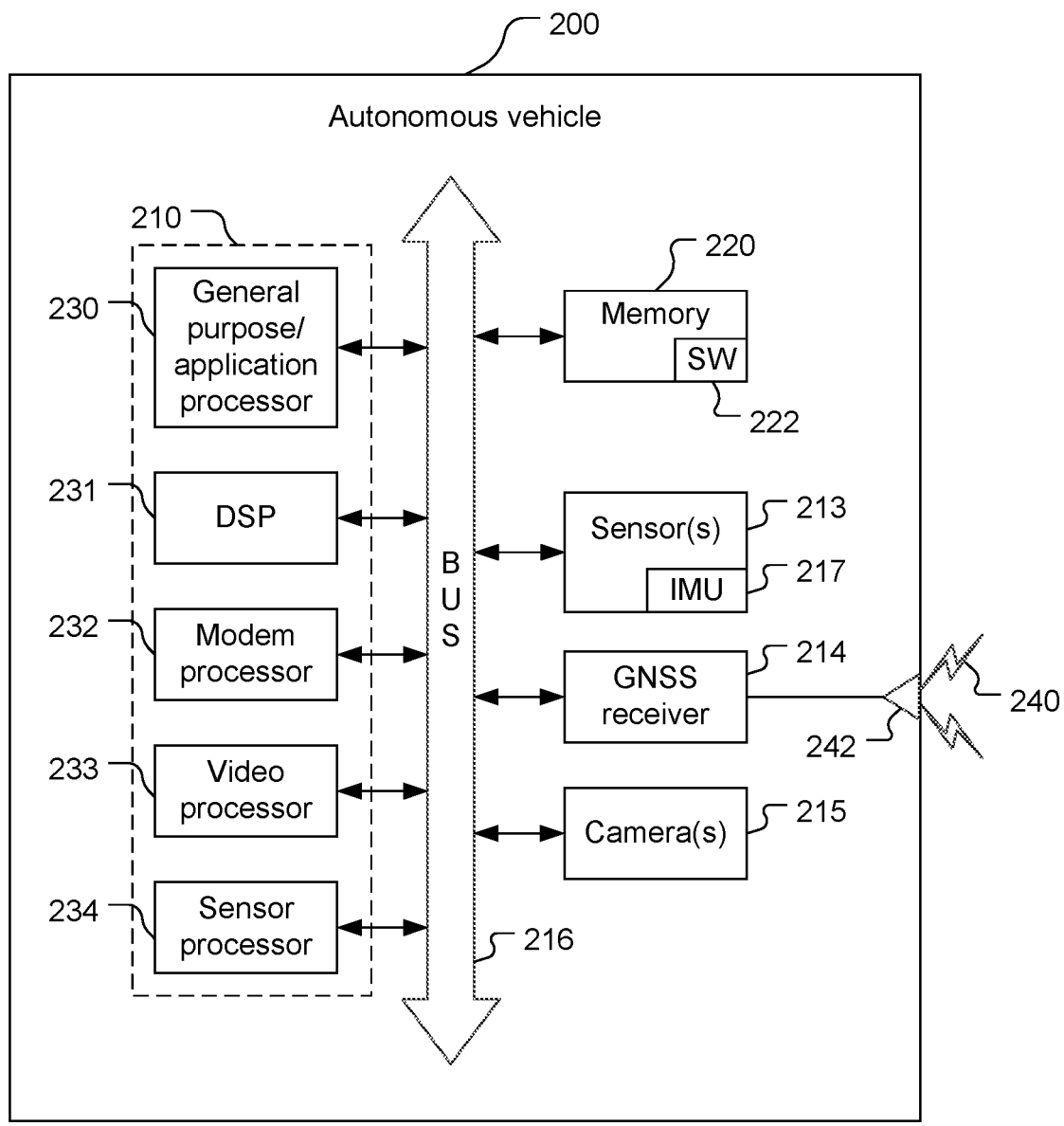
FIG. 2 is a block diagram of an example autonomous vehicle.

Referring also to FIG. 2, an autonomous vehicle 200, of which the vehicle 110 may be an example, may comprise a computing platform including a processor 210, memory 220 including software (SW) 222, one or more sensors 213, a Global Navigation Satellite System (GNSS) receiver 214, and one or more cameras 215. The processor 210, the memory 220, the sensor(s) 213, the GNSS receiver 214, and the camera(s) 215 may be communicatively coupled to each other by a bus 216 (which may be configured, e.g., for optical and/or electrical communication). Even if referred to in the singular, the processor 210 may include one or more processors, the memory 220 may include one or more memories, and/or the GNSS receiver 214 may include one or more GNSS receivers. One or more of the shown apparatus (e.g., the camera(s) 215) may be omitted from the autonomous vehicle 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the autonomous vehicle 200 for connectivity. The memory 220 may be a non-transitory storage medium that may include random access memory (RAM), flash memory, disc memory, and/or read-only memory (ROM), etc. The memory 220 may store the software 222 which may be non-transitory, processor-readable, processor-executable software code containing instructions that may be configured to, when executed, cause the processor 210 to perform various functions described herein. Alternatively, the software 222 may not be directly executable by the processor 210 but may be configured to cause the processor 210, e.g., when compiled and executed, to perform the functions. The description herein may refer to the processor 210 performing a function, but this may include other implementations such as where the processor 210 executes software and/or firmware. The description may refer to the processor 210 performing a function as shorthand for one or more of the processors 230-234 performing the function. The description may refer to the autonomous vehicle 200 performing a function as shorthand for one or more appropriate components of the autonomous vehicle 200 performing the function. The processor 210 may include a memory with stored instructions in addition to and/or instead of the memory 220. Functionality of the processor 210 is discussed more fully below.

The configuration of the autonomous vehicle 200 shown in FIG. 2 is an example and not limiting of the disclosure, including the claims, and other configurations may be used. For example, an example configuration of the autonomous vehicle may include one or more of the processors 230-234 of the processor 210 and the memory 220. Other example configurations may omit one or more of the processors 230-234.

The autonomous vehicle 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) 217 of the sensor(s) 213 may comprise, for example, one or more yaw rate sensors, one or more accelerometers (e.g., collectively responding to acceleration of the autonomous vehicle 200 in three dimensions) and/or one or more gyroscopes (e.g., three-dimensional gyroscope(s)). The sensor(s) 213 may generate analog and/or digital signals, indications of which may be stored in the memory 220 and processed by the DSP 231 and/or the general-purpose/application processor 230 in support of one or more applications such as, for example, applications directed to estimating yaw rate sensor bias and removing the estimated yaw rate sensor bias from a yaw rate measurement to yield an estimated true yaw rate of the autonomous vehicle 200.

The IMU 217 may be configured to provide measurements about a direction of motion and/or a speed of motion of the autonomous vehicle 200, which may be used in various applications, e.g., blind stopping of the autonomous vehicle 200. For example, one or more accelerometers and/or one or more yaw rate sensors of the IMU 217 may detect, respectively, a translational acceleration and an angular velocity of the autonomous vehicle 200. The translational acceleration and angular velocity measurements of the autonomous vehicle 200 may be integrated over time to determine an instantaneous direction of motion as well as a displacement of the autonomous vehicle 200. The instantaneous direction of motion and the displacement may be integrated to track a location of the autonomous vehicle 200 and compared with a known displacement limit, e.g., lateral limits of the lane 141, and steering correction(s) may be made to help keep the autonomous vehicle 200 within the lane 141 while being autonomously stopped (e.g., without aid of camera images).

The GNSS receiver 214 (e.g., a Global Positioning System (GPS) receiver) may be capable of receiving and acquiring GNSS signals 240 via a GNSS antenna 242. The GNSS antenna 242 may be configured to transduce the GNSS signals 240 from wireless signals to wired signals, e.g., electrical or optical signals. The GNSS receiver 214 may be configured to process, in whole or in part, the acquired GNSS signals 240 for estimating a location of the autonomous vehicle 200. For example, the GNSS receiver 214 may be configured to determine location of the autonomous vehicle 200 by trilateration using the GNSS signals 240. The general-purpose/application processor 230, the memory 220, the DSP 231 and/or one or more specialized processors (not shown) may be utilized to process acquired GNSS signals, in whole or in part, and/or to calculate an estimated location of the autonomous vehicle 200, in conjunction with the GNSS receiver 214. The memory 220 may store indications (e.g., measurements) of the GNSS signals 240 and/or other signals for use in performing positioning operations, e.g., determining the location of the autonomous vehicle 200 over time and determining whether the autonomous vehicle 200 is moving in a straight line. The general-purpose/application processor 230, the DSP 231, and/or one or more specialized processors, and/or the memory 220 may provide and/or support a location engine for use in processing measurements to estimate a location of the autonomous vehicle 200.

The autonomous vehicle 200 may include the camera(s) 215 for capturing still or moving imagery. The camera(s) 215 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown) of the autonomous vehicle 200.

Figure 3:
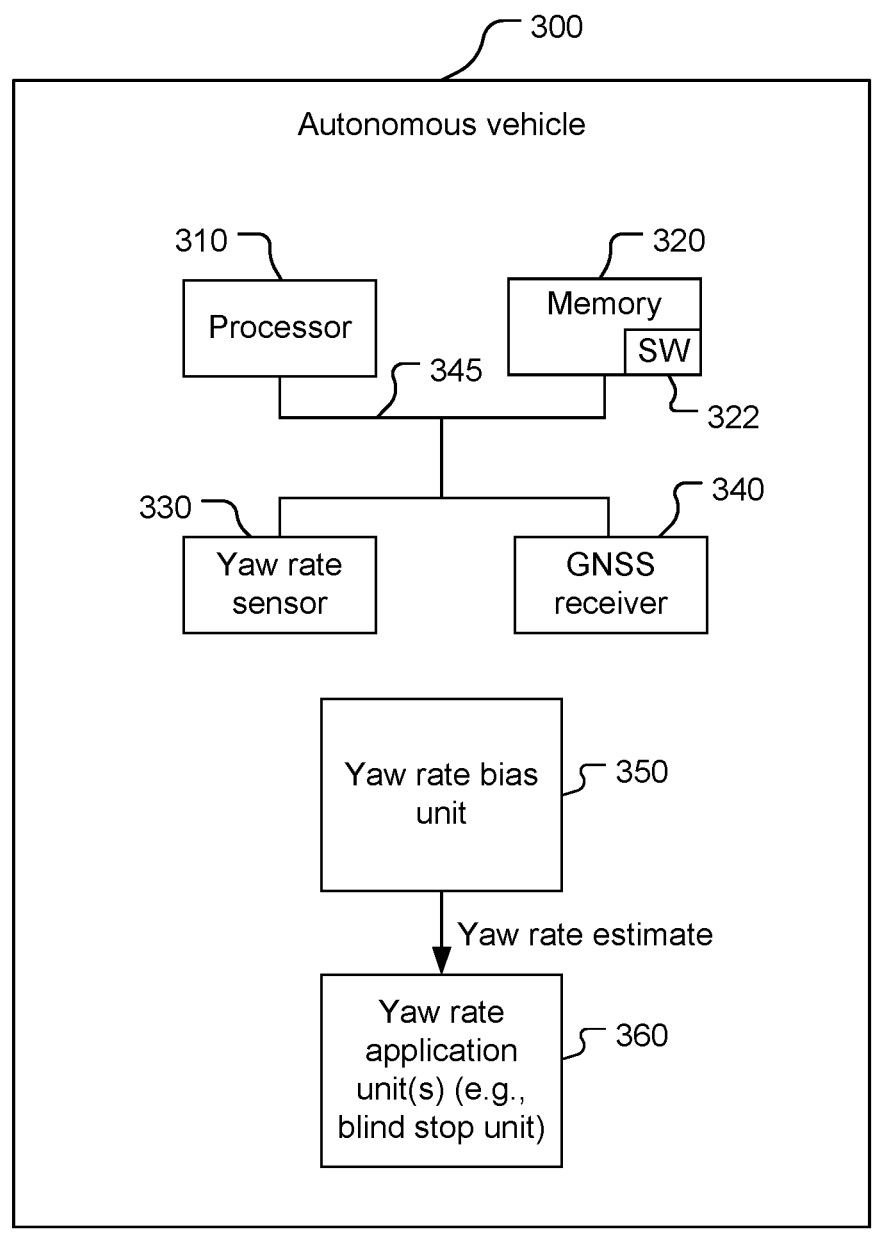
FIG. 3 is a block diagram of another example autonomous vehicle.

Referring also to FIG. 3, an autonomous vehicle 300, of which the autonomous vehicle 200 may be an example, may comprise a computing platform including a processor 310, memory 320 including software (SW) 322, a yaw rate sensor 330, a GNSS receiver 340, a yaw rate bias unit 350, and one or more yaw rate application units 360. The processor 310, the memory 320, the yaw rate sensor 330, and the GNSS receiver 340 may be communicatively coupled to each other by a bus 345 (which may be configured, e.g., for optical and/or electrical communication). Even if referred to in the singular, the processor 310 may include one or more processors, the memory 320 may include one or more memories, the yaw rate sensor 330 may include one or more yaw rate sensors, and/or the GNSS receiver 340 may include one or more GNSS receivers. One or more of the shown apparatus may be omitted from the autonomous vehicle 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 320 may be a non-transitory, processor-readable storage medium that may include random access memory (RAM)), flash memory, disc memory, and/or read-only memory (ROM), etc. The memory 320 may store the software 322 which may be processor-readable, processor-executable software code containing instructions that are configured to, when executed, cause the processor 310 to perform various functions described herein. Alternatively, the software 322 may not be directly executable by the processor 310 but may be configured to cause the processor 310, e.g., when compiled and executed, to perform the functions. While the description herein may focus on the autonomous vehicle 300, the description may apply to other mobile apparatus and/or one or more components thereof, e.g., a component of a mobile apparatus such as an ADAS (Advanced Driver Assistance System) engine. A mobile apparatus is an apparatus that is configured to be mobile, but at any given time may be in motion or stationary.

The description herein may refer to the processor 310 performing a function, but this may include other implementations such as where the processor 310 executes software and/or firmware. The description herein may refer to the processor 310 performing a function as shorthand for one or more of the processors contained in the processor 310 performing the function. The description herein may refer to the autonomous vehicle 300 performing a function as shorthand for one or more appropriate components (e.g., the processor 310 and the memory 320) of the autonomous vehicle 300 performing the function. The processor 310 may include a memory with stored instructions in addition to and/or instead of the memory 320. The processor 310 and/or the memory 320 may include the yaw rate bias unit 350 and/or one or more of the yaw rate application unit(s) 360. Also or alternatively, the yaw rate bias unit 350 and/or one or more of the yaw rate application units 360 may be implemented with distinct hardware and/or firmware, or may be implemented partially by the processor 310 and/or the memory 320 and partially by other means (e.g., distinct hardware and/or firmware). The yaw rate bias unit 350 may be configured to determine a yaw rate sensor bias estimate and to compensate yaw rate sensor measurements using the bias estimate, e.g., removing the yaw rate sensor bias estimate from yaw rate sensor measurements. The yaw rate bias unit 350 is discussed further below, and the description may refer to the processor 310 generally, or the autonomous vehicle 300 generally, as performing any of the functions of the yaw rate bias unit 350, with the autonomous vehicle 300 being configured to perform the functions.

The configuration of the autonomous vehicle 300 shown in FIG. 3 is an example and not limiting of the disclosure, including the claims, and other configurations may be used. For example, the processor 310 and the memory 320 are shown and may be discussed as being separate from the yaw rate sensor 330, but the yaw rate sensor 330 may include a processor and memory, e.g., to implement the yaw rate bias unit 350.

The yaw rate sensor 330 may have an inherent bias that may change over time. Yaw rate sensor measurements include the true yaw rate and the bias and can be expressed as follows $$\psi_{sensor} = \psi_{true} + b$$

where $\psi_{sensor}$ is the yaw rate provided by the yaw rate sensor 330, $\psi_{true}$ is the actual or true yaw rate, and b is the yaw rate sensor bias. An estimate of the true yaw rate (e.g., for use by a blind stop application of the yaw rate application unit(s) 360) may be estimated by estimating the yaw rate sensor bias and removing this bias estimate from the sensor measurement as follows $$\psi_{true,est} = \psi_{sensor} - b_{est} \quad (2)$$

where $\psi_{true,est}$ is the estimate of the true yaw rate (also called the estimated true yaw rate), and best is the estimate of the yaw rate sensor bias (of the yaw rate sensor 330). The estimated true yaw rate may be provided by the yaw rate bias unit 350 to the yaw rate application unit(s) 360. Depending on the use of the estimate of the true yaw rate, the estimate of the true yaw rate may need to be within a threshold of the true yaw rate to be useful. For example, for a blind stop application, the estimate of the true yaw rate may need to be within an accuracy threshold of the true yaw rate to ensure that the autonomous vehicle 300 will be stopped within a lane in which the vehicle is traveling when the stop is initiated. The value of this accuracy threshold may depend on the speed of the vehicle 300 when the stop is initiated (e.g., the threshold being smaller for faster initial speeds). The value of the accuracy threshold may be determined in any of a variety of manners, e.g., finding the accuracy threshold in a look-up table of initial vehicle speeds and corresponding accuracy threshold values.

Prior techniques for compensating for yaw rate sensor bias used the yaw rate indicated by the yaw rate sensor to determine when the true yaw rate was zero or nearly so (e.g., due to an apparatus containing the yaw rate sensor moving in a straight line (or nearly so)). If the yaw rate sensor measurement provided by the yaw rate sensor was zero or nearly zero, then the present (or perhaps averaged) yaw rate measurement was stored as an estimate of the yaw rate sensor bias. For example, straight-line motion may be determined based on the absolute value of a difference between the yaw rate sensor measurement minus the yaw rate bias estimate being less than a threshold. Based on the straight-line movement determination, bias learning may be performed such that the present (or averaged) yaw rate measurement may be stored as the yaw rate sensor bias. The straight-line driving determination may, however, be incorrect, leading to an incorrect learned yaw rate sensor bias. That is, this detection logic may detect straight-line motion for times of zero true yaw rate and times of small non-zero true yaw rate. If the yaw rate bias estimate is updated (learned) based on this detection logic, then the estimated yaw rate sensor bias may be inaccurate. Accurate estimation of the yaw rate sensor bias was not possible because a single known value (a measurement of yaw rate) was trying to be used to determine two unknown state variables (the true yaw rate and the yaw rate sensor bias). That is, an observability condition (i.e., the ability to solve for one or more unknowns based on one or more knowns) was not satisfied.

The yaw rate bias unit 350 may be configured to use multiple measurements of different parameters, thus making a solution observable for the true yaw rate and the yaw rate sensor bias. The yaw rate bias unit 350 may add an ability to detect zero true yaw rate motion (e.g., straight-line driving) via another sensor (i.e., other than the yaw rate sensor 330), e.g., the GNSS receiver 340. With the additional data source providing one or more additional data points, the observability condition (i.e., of measurements equaling or exceeding unknowns) is met.

Figure 4:
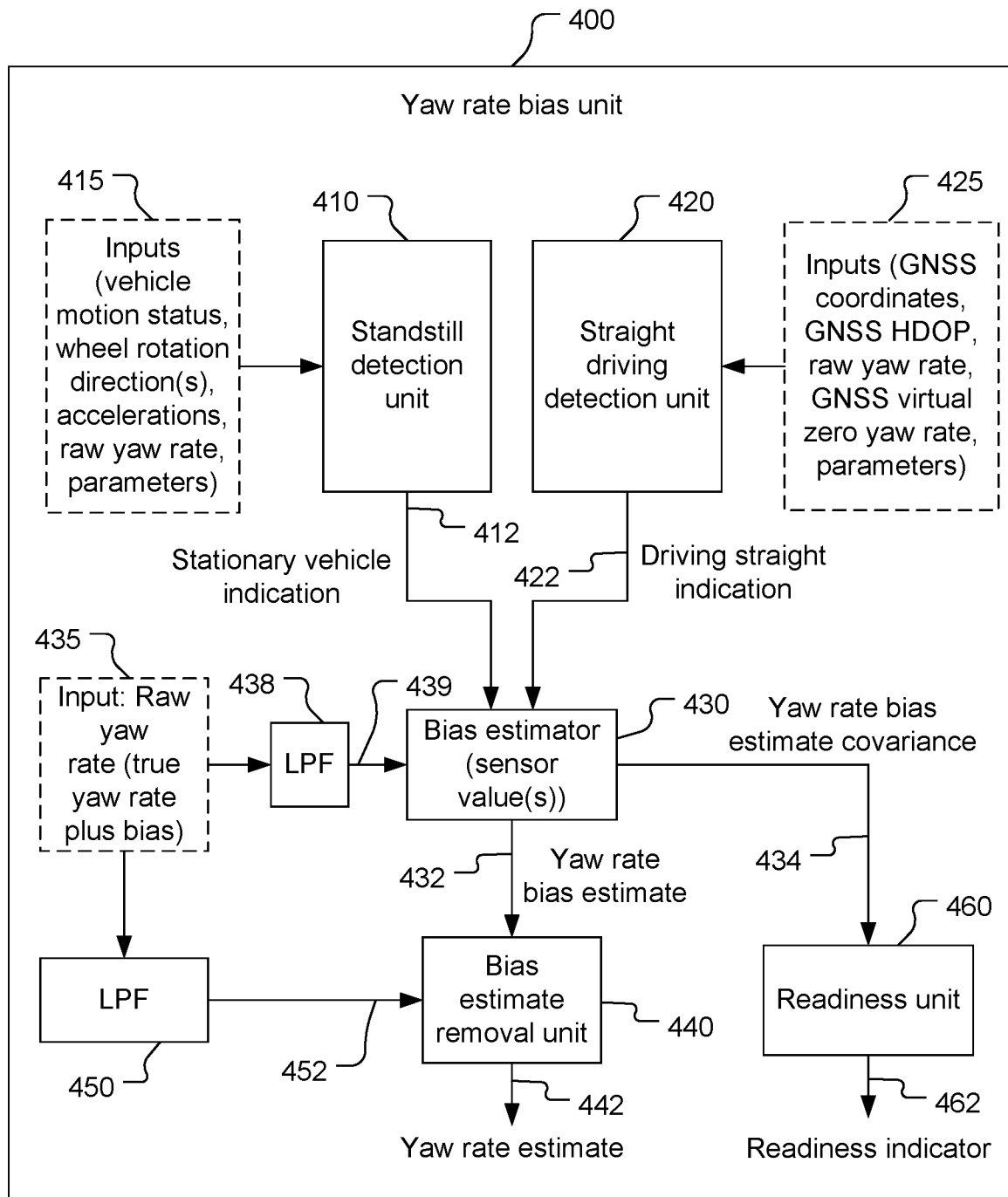
FIG. 4 is a block diagram of an example of a yaw rate bias unit shown in FIG. 3.

Referring also to FIG. 4, a yaw rate bias unit 400, which is an example of the yaw rate bias unit 350, may include a standstill detection unit 410, a straight driving detection unit 420, a bias estimator 430, an LPF 438 (Low Pass Filter), a bias estimate removal unit 440, an LPF 450, and a readiness unit 460. The configuration of the yaw rate bias unit 400 shown is an example, and other configurations may be used. The yaw rate bias unit 400 may be configured to determine times of zero true yaw rate of the vehicle 300, e.g., when the vehicle 300 is at a standstill or is traveling in a straight line (or nearly so). If yaw rate measurements correspond to zero true yaw yate, then the yaw rate measurements may be used to produce an estimate of the yaw rate sensor bias. For example, when the yaw rate bias unit 400 determines that the vehicle 300 has zero true yaw rate, the low-pass filtered output of the yaw rate sensor 330 may be averaged to produce an estimate of the yaw rate sensor bias by a Kalman filter. The estimate of the yaw rate sensor bias may be stored, thus updating a previously-stored yaw rate sensor bias estimate. If the yaw rate bias unit 400 determines that the vehicle has non-zero true yaw rate, then the stored yaw rate sensor bias may be held constant. The estimate of the yaw rate sensor bias may be removed from raw yaw rate measurements, e.g., low-pass-filtered raw yaw rate measurements, to yield an estimate of the true yaw rate.

The standstill detection unit 410 may be configured to use inputs 415 to determine whether the vehicle 300 is considered to be stationary. For example, the standstill detection unit 410 may use vehicle motion status, wheel rotation directions, accelerations (raw acceleration measurements), raw yaw rate (i.e., yaw rate sensor measurement including true yaw rate and yaw rate sensor bias), and one or more parameters (e.g., thresholds) to determine whether the vehicle 300 is considered to be at a standstill using one or more known techniques. For example, the standstill detection unit 410 may determine relative motion of the vehicle 300 to a surface on which the vehicle 110 rests, and determine whether that surface is stationary. The standstill detection unit 410 may be configured to output a stationary vehicle indication 412, e.g., a Boolean indicator, e.g., with a value of "1" indicating that the vehicle 300 is at a standstill (i.e., with zero true yaw rate) and a value of "0" indicating that the vehicle 300 is not at a standstill.

The straight driving detection unit 420 may be configured to use inputs 425, including GNSS inputs, to determine whether the vehicle 300 is considered to be in a state of straight-line driving. For example, the straight driving detection unit 420 may use GNSS coordinates (of locations determined by the GNSS receiver 340 corresponding to different times), GNSS HDOP (Horizontal Dilution Of Precision) data, raw yaw rate, GNSS virtual zero yaw rate, and one or more parameters (e.g., thresholds such as an axis ratio threshold discussed further below) to determine whether the vehicle 300 is considered to be driving in a straight line. The straight driving detection unit 420 may be configured to output a driving straight indication 422, e.g., a Boolean indicator, e.g., with a value of "1" indicating that the vehicle 300 is considered to be moving in a straight line (i.e., with zero true yaw rate) and a value of "0" indicating that the vehicle 300 is considered not to be moving in a straight line (i.e., with non-zero true yaw rate or true yaw rate above a threshold).

The bias estimator 430 may be configured to determine a yaw rate bias estimate in response to the vehicle 300 having a zero true yaw rate as determined by the standstill detection unit 410 or the straight driving detection unit 420. The bias estimator 430 may be configured to analyze the stationary vehicle indication 412 and the driving straight indication 422 to determine whether the vehicle 300 has zero true yaw rate. One or both of the indications 412, 422 may include an indication of confidence of the correctness of the indication 412, 422. The bias estimator 430, e.g., a Kalman filter, may use the confidence(s) in conjunction with the respective indication(s) to determine that the vehicle 300 has zero true yaw rate (e.g., the bias estimator 430 may determine, with at least a threshold confidence, that the vehicle 300 is at a standstill (i.e., is considered to be at a standstill) or is driving straight (i.e., considered to be driving straight)). The LPF 438 may filter an input 435 of a raw yaw rate measurement from the yaw rate sensor 330 to produce a filtered raw yaw rate 439 that may be provided to the bias estimator 430. In response to the bias estimator 430 determining that the vehicle has zero true yaw rate, the bias estimator 430, that includes a Kalman filter, may use the filtered raw yaw rate 439 from the LPF 438 to obtain an estimate of the yaw rate sensor bias. The input 435 includes the true yaw rate and the yaw rate sensor bias, but with the present true yaw rate being estimated by the standstill detection unit 410 or the straight driving detection unit 420 to be zero, the raw yaw rate may be estimated to contain the yaw rate sensor bias only. The bias estimator 430 may be a Kalman filter that estimates the yaw rate sensor bias based on a filtered yaw rate measurement (i.e., may determine one unknown based on one measurement). The bias estimator 430 may be gated on the stationary vehicle indication 412 and the driving straight indication 422 (i.e., may estimate the bias based on either of the indications 412, 422 indicating zero true yaw rate (i.e., the vehicle 300 is considered to be stationary or is considered to be moving straight)). The bias estimator 430 may replace a previously-stored estimated yaw rate sensor bias with a newly-obtained yaw rate sensor bias estimate, thus updating the estimated yaw rate sensor bias. An indication of zero true yaw rate from either of the units 410, 420 may trigger updating of the estimated yaw rate sensor bias. The bias estimator 430 may use the filtered raw yaw rate 439 based on zero true yaw rate being indicated, such that the bias estimator 430 may treat the yaw rate sensor 330 as a sensor with an output that is only available when the filtered raw yaw rate 439 has true yaw rate of zero. The bias estimator 430 may hold the yaw rate sensor bias constant if the bias estimator 430 determines that the true yaw rate (i.e., filtered raw yaw rate minus yaw rate sensor bias) has a non-zero value. The bias estimator 430 may output a yaw rate bias estimate indication 432 to the bias estimate removal unit 440. The indication 432 could be an actual value of the estimated bias, or a shortened indication (e.g., a differential indication relative to a reference (e.g., a most-recent estimated bias output by the bias estimator)), or a coded indication (e.g., an index that can be mapped to an estimated bias in a look-up table, etc.).

The bias estimator 430 may provide a yaw rate bias estimate covariance indication 434 to the readiness unit 460 that may determine a readiness of the yaw rate bias estimate based on the indication 434, and may indicate readiness (ready or not ready) with a readiness indicator 462. The Kalman filter of the bias estimator 430 may estimate the yaw rate sensor bias and may estimate an uncertainty of the estimate of the raw rate sensor bias. A covariance of the yaw rate bias estimate increases (e.g., to account for a ramp rate of the yaw rate sensor 330, etc.) each time the bias estimator 430 determines not to update the yaw rate sensor bias (in response to either of the indications 412, 422 indicating non-zero true yaw rate). If the yaw rate sensor bias estimate covariance indicated by the indication 434 exceeds a first threshold (an application-specific accuracy threshold), then the estimated yaw rate sensor bias may no longer be trusted, and the readiness indicator 462 may provide a not ready indication. In response to the not ready indication (e.g., with the readiness indicator provided to one or more of the yaw rate application unit(s) 360), the estimated yaw rate sensor bias may be ignored or otherwise not used, and/or one or more of the yaw rate application unit(s) 360 may be disabled, e.g., autonomous blind stop disabled and control of stopping turned over to a driver of the vehicle 300. With a low initial covariance, the covariance without an updated yaw rate sensor bias estimate may not exceed the first threshold for multiple minutes. Once the covariance has exceeded the first threshold, a new estimated yaw rate sensor bias may not be used until the covariance drops below a second threshold that is lower than the first threshold, providing hysteresis to the determination of whether to use the estimated yaw rate sensor bias. The covariance thresholds may be speed-dependent values, e.g., with higher initial vehicle speeds corresponding to lower thresholds resulting in a shorter time window without a yaw rate sensor bias update before determining that the yaw rate sensor bias estimate is unreliable.

The bias estimate removal unit 440 may be configured to remove the estimated yaw rate sensor bias from filtered yaw rate sensor measurements. The input 435 (raw yaw rate measurement) may be filtered by the LPF 450 that may provide a filtered raw yaw rate 452 to the bias estimate removal unit 440. The bias estimate removal unit 440 may subtract the estimated yaw rate bias, as indicated by the yaw rate bias estimate indication 432, from the filtered raw yaw rate 452 in accordance with Equation (2) to yield a yaw rate estimate 442, which is an estimate of the true yaw rate of the vehicle 300, that the bias estimate removal unit 440 may be configured to output, e.g., to the yaw rate application(s) 360.

Figure 5:
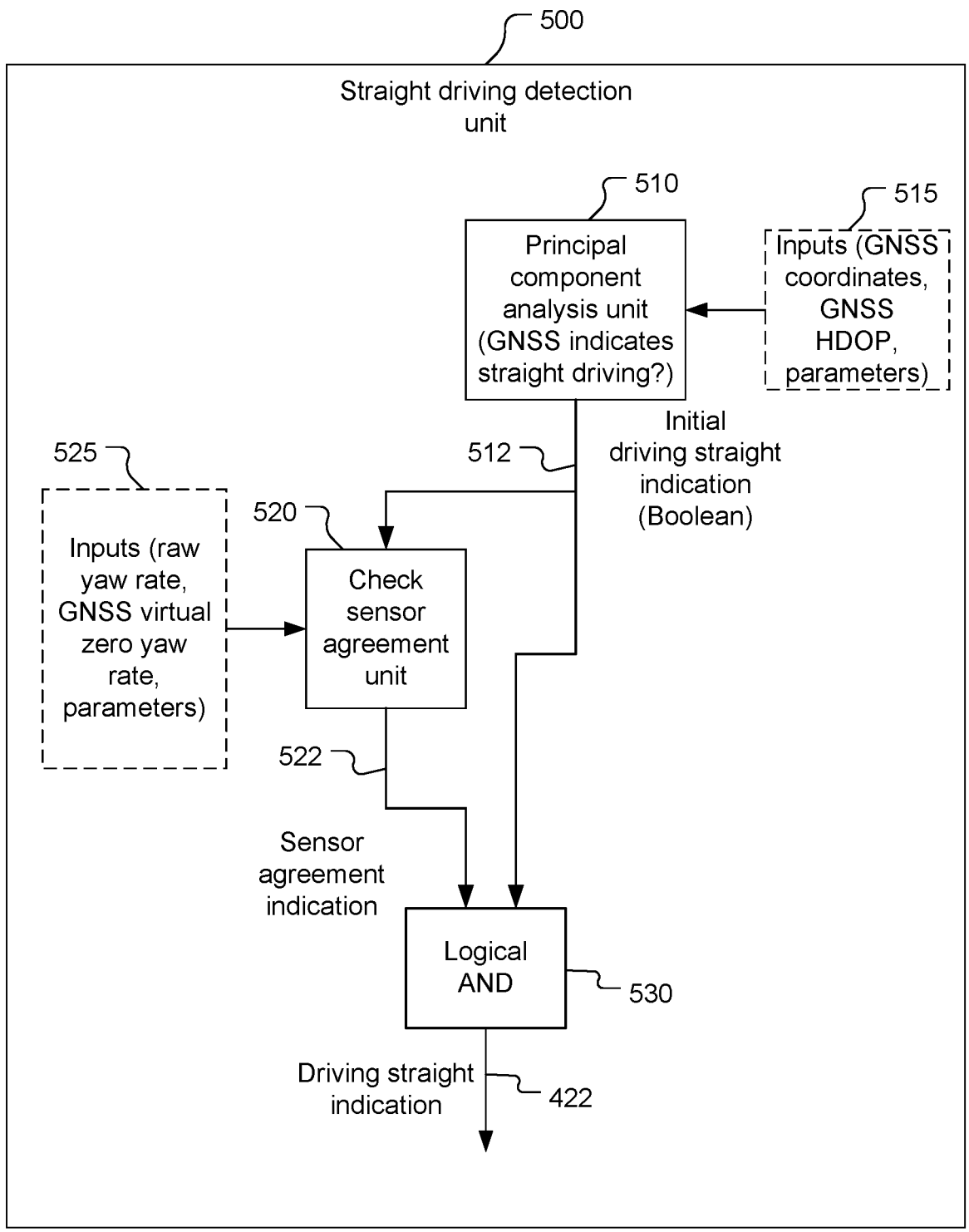
FIG. 5 is a block diagram of an example of a straight driving detection unit shown in FIG. 4.

Referring also to FIG. 5, a straight driving detection unit 500, which is an example of the straight driving detection unit 420, may include a principal component analysis unit 510, a check sensor agreement unit 520, and a logical AND 530. The straight driving detection unit 500 may be configured to make an initial GNSS virtual zero yaw rate determination, based on GNSS data (e.g., locations determined for the vehicle 300 at different times by the GNSS receiver 340), that the vehicle 300 is moving in a straight line and thus assumed to have a zero true yaw rate. The straight driving detection unit 500 may be configured to determine whether yaw rate sensor measurements and the GNSS virtual zero yaw rate determination agree, and to provide the driving straight indication 422 based on the initial driving straight determination and the determination regarding sensor agreement. The GNSS receiver 340 may act as a virtual zero yaw rate sensor by providing information from which a virtual zero (near zero) yaw rate may be determined (e.g., from straight-line movement).

The principal component analysis unit 510 may be configured to analyze GNSS data to determine whether the vehicle 300 is driving in a straight line (i.e., driving within a threshold deviation of a straight line and thus considered to be driving in a straight line). For example, the principal component analysis unit 510 (PCA unit 510) may receive GNSS inputs 515 from the GNSS receiver 340. The GNSS inputs 515 may include indications of GNSS coordinates for multiple locations (called GNSS locations) of the vehicle 300 corresponding to different times. The PCA unit 510 may map the GNSS coordinates to a local coordinate system in a plane tangential to the surface of the Earth, use a linear approximation for the GNSS locations (which is a very good approximation within a small span (e.g., 400 m or less) of the GNSS locations) and may use differential coordinates (with coordinates represented by differentials relative to a reference, e.g., the coordinates of a one of the received locations). This may greatly reduce the processing requirements for determining whether the vehicle 300 is driving straight, e.g., which may allow for single precision floating point representations of the coordinates and may eliminate the mathematical conversion of GNSS latitude and longitude coordinates to Cartesian coordinates. The GNSS inputs 515 may include GNSS HDOP data, and the PCA unit 510 may use the HDOP data and the GNSS coordinates to determine, for each of the received GNSS locations, whether to use the GNSS location to determine whether the vehicle 300 is driving straight. Each GNSS location that the PCA unit 510 decides to use to determine whether the vehicle 300 is driving straight may be called a valid GNSS location.

Figure 6:
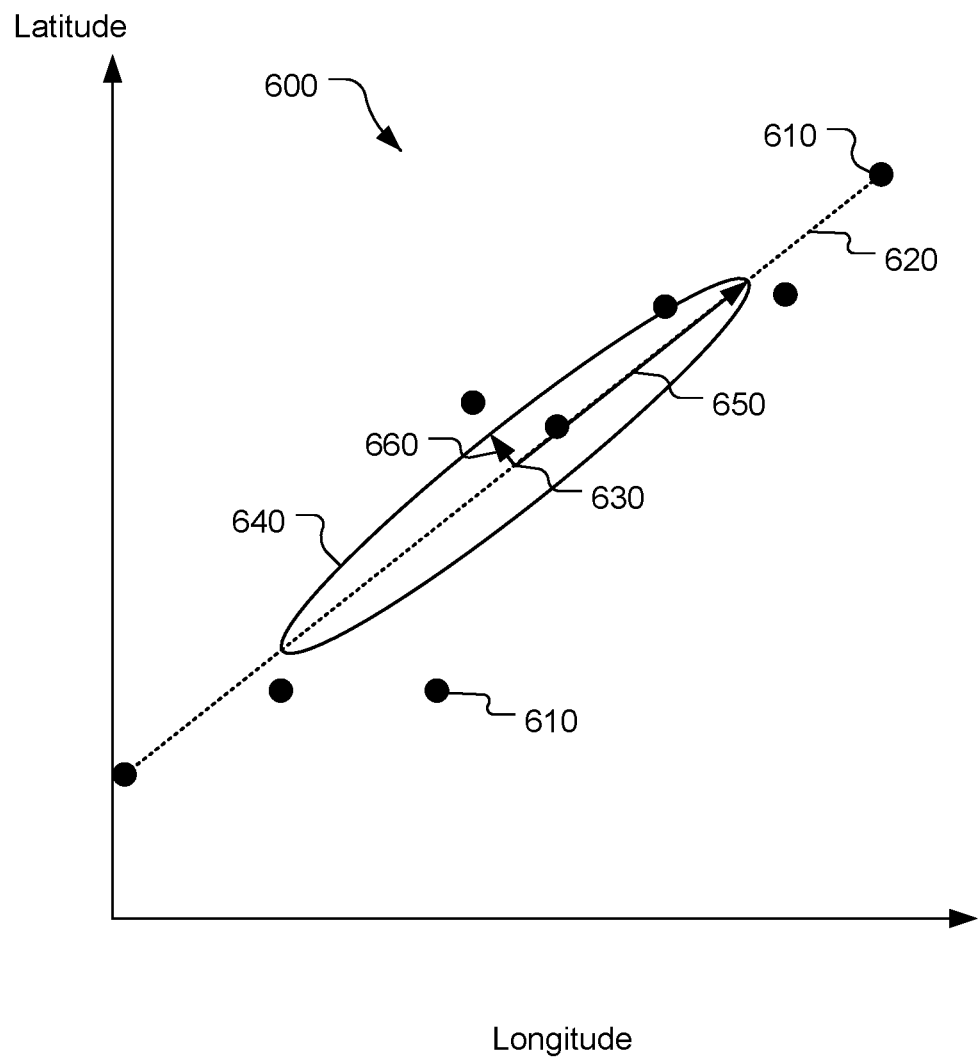
FIG. 6 is a latitude and longitude plot of locations determined over time by a global navigation satellite system receiver.

Referring also to FIG. 6, the PCA unit 510 may analyze the valid GNSS locations as graphically shown in a plot 600. The PCA unit 510 may be configured to analyze coordinates of multiple valid GNSS locations 610 to determine a line segment of travel 620, a midpoint 630 of the line segment of travel 620, an ellipse 640 defined by a long-axis standard deviation 650 (along the line segment of travel 620) and a short-axis standard deviation 660 (perpendicular to the line segment of travel 620). The PCA unit 510 may determine the long-axis standard deviation 650 and the short-axis standard deviation 660, which are the principal components of the ellipse 640, using SVD (Singular Value Decomposition). The PCA unit 510 may be configured to calculate an axis ratio according to $$\text{Axis ratio} = \frac{\sigma_{short}}{\sigma_{long}} \quad (3)$$

where $\sigma_{short}$ is the short-axis standard deviation 660 and $\sigma_{long}$ is the long axis standard deviation 650. The axis ratio is thus a ratio of orthogonal standard deviations. The PCA unit 510 may determine that the vehicle 300 is driving straight based on the axis ratio being below a threshold axis ratio. The threshold axis ratio may be determined experimentally, and may vary depending on a variety of factors, e.g., vehicle speed, maximum vehicle speed, quality of the GNSS receiver 340 (e.g., rate at which GNSS data are received (e.g., 1 Hz, 10 Hz, etc.), etc. For example, an axis ratio threshold of 0.008 may be used based on a maximum vehicle speed of 80 kph The threshold axis ratio may be set based on an accuracy tradeoff (setting the threshold axis ratio very low may result in very accurate yaw rate bias estimates but undesirably infrequent updating of the yaw rate bias estimate while setting the threshold axis ratio very high may result in frequent updates of the estimated yaw rate bias but undesirably inaccurate yaw rate bias estimates). The PCA unit 510 may be configured to provide an initial driving straight indication 512 based on whether the vehicle 300 is driving straight as determined by the PCA unit 510 based on the GNSS inputs 515. The indication 512 may be a Boolean value, e.g., with a value of "1" indicating straight driving and a value of "0" indicating non-straight driving. The initial driving straight indication 512 may be provided to the check sensor agreement unit 520 and to the logical AND 530.

Referring again to FIG. 5, the check sensor agreement unit 520 may be configured to determine whether sensors (here, the yaw rate sensor 330 and the GNSS receiver 340) agree that the vehicle 300 is driving straight. For example, the check sensor agreement unit 520 may receive sensor inputs 525 that include the raw yaw rate from the yaw rate sensor 330, and may use a GNSS virtual zero yaw rate as a GNSS sensor yaw rate measurement to determine whether there is sensor agreement. The GNSS virtual zero yaw rate may be provided to the check sensor agreement unit 520 in response to the true yaw rate, as determined using the GNSS receiver 214, being zero. The GNSS virtual zero yaw rate may be provided as an input to a Kalman filter of the check sensor agreement unit 520. An analog value of zero may be presented to the check sensor agreement unit 520 and the Kalman filter of the check sensor agreement unit 520 may use this input based on the initial driving straight indication 512 indicating straight driving. The check sensor agreement unit 520 may determine whether there is sensor agreement in response to the initial driving straight indication 512 indicating straight driving (and may not check for sensor agreement otherwise). A Kalman filter of the check sensor agreement unit 520 may weight the GNSS virtual zero yaw rate (considered to be a GNSS sensor measurement) based on a confidence level that the value of the initial driving straight indication 512 is correct. For example, if the yaw rate of the vehicle 300 would have had to have changed more rapidly than expected (e.g., more rapidly than reasonably possible), then the check sensor agreement unit 520 may weight the GNSS virtual zero yaw rate very low. The check sensor agreement unit 520 may compare the raw yaw rate from the yaw rate sensor 330 with the GNSS virtual zero yaw rate (with either or both of these sensor values weighted by the Kalman filter based on confidence of accuracy). The Kalman filter may monitor yaw rate measurement residuals, which are the differences between actual yaw rate measurements and predicted yaw rate measurements. If the yaw rate measurement residual values and variances of the residuals are acceptably low (e.g., below a residual threshold and a variance threshold such that the residuals are close to zero and with a small standard deviation), then the check sensor agreement unit 520 may conclude that the sensors agree. For example, an example yaw rate measurement residual threshold may be 0.003 rad/sec, an example yaw rate measurement residual variance threshold may be 0.0002 $rad^2/sec^2$, an example GNSS measurement residual threshold may be 0.0004 rad/sec, and an example GNSS measurement residual variance threshold may be 0.0002 $rad^2/sec^2$. The check sensor agreement unit 520 may be configured to provide a sensor agreement indication 522 to the logical AND 530. The sensor agreement indication 522 may be a Boolean indication, e.g., with a value of "1" indicating sensor agreement and a value of "0" indicating that the sensors do not agree. If the sensors do not agree, e.g., because one sensor operates slower and thus may indicate straight driving after the vehicle 300 has changed from straight driving (zero true yaw rate) to non-straight driving (non-zero true yaw rate), then the estimated yaw rate sensor bias should not be updated, e.g., with a present yaw rate measurement. By implementing this check, updating the estimated yaw rate bias estimate based on a false positive of driving straight may be avoided (which may avoid updating the yaw rate bias estimate with an inaccurate value).

The logical AND 530 may be configured to produce the driving straight indication 422 based on the initial driving straight indication 512 and the sensor agreement indication 522. The logical AND 530 may produce the driving straight indication indicating straight driving (e.g., a Boolean value of "1") based on the initial driving straight indication 512 indicating straight driving and the sensor agreement indication 522 indicating sensor agreement of zero true yaw rate (e.g., both indications 512, 522 having logical values of "1"). The logical AND 530 may produce the driving straight indication indicating non-straight driving (e.g., a Boolean value of "0") otherwise, e.g., if the initial driving straight indication 512 indicates non-straight driving and/or the sensor agreement indication 522 indicating lack of sensor agreement (e.g., either or both indications 512, 522 having a logical value of "0").

Figure 7:
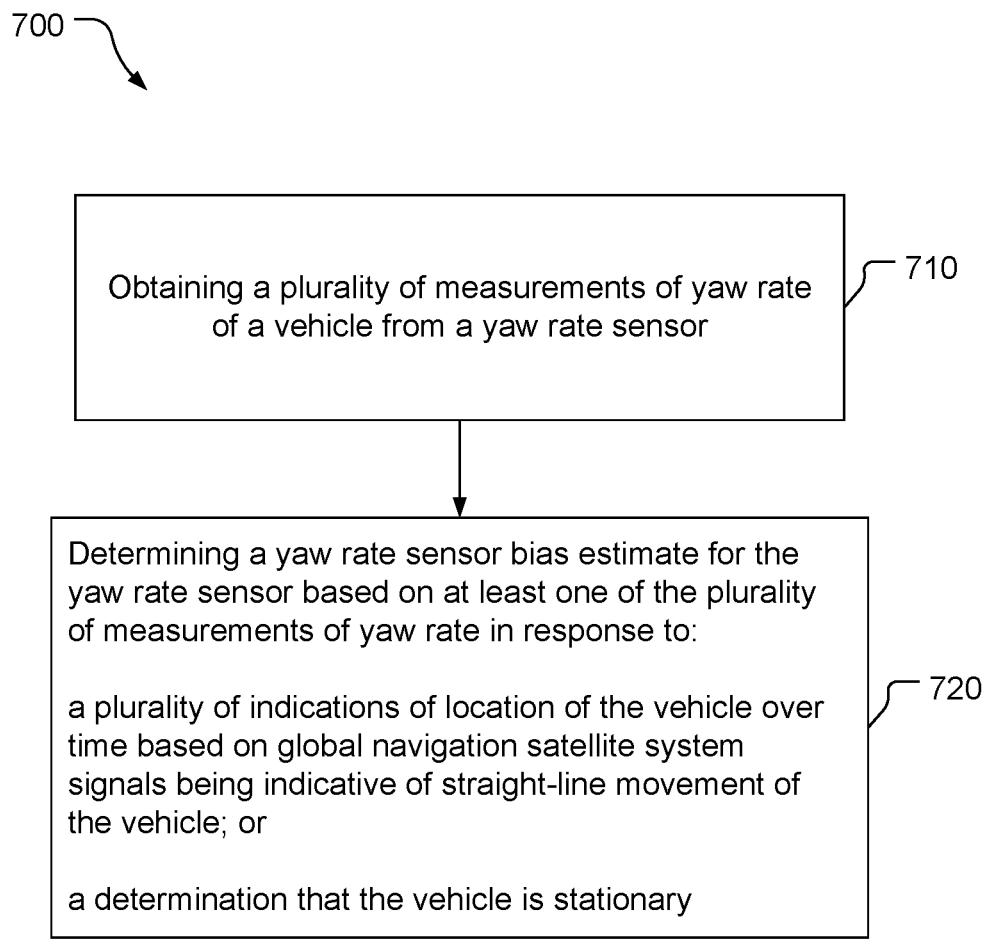
FIG. 7 is a block flow diagram of a yaw rate related method.

Referring to FIG. 7, with further reference to FIGS. 1-6, a yaw rate related method 700 includes the stages shown. The method 700 is, however, an example only and not limiting. The method 700 may be altered, e.g., by having one or more stages added, removed, rearranged, combined, performed concurrently, and/or by having one or more single stages split into multiple stages.

At stage 710, the method 700 includes obtaining a plurality of measurements of yaw rate of a vehicle from a yaw rate sensor. For example, the yaw rate sensor 330 may measure yaw rates of the vehicle 300 and provide indications of the yaw rates, e.g., as part of the inputs 415, 425, 435, 525. The processor 310, possibly in combination with the memory 320, may comprise means for obtaining a plurality of measurements of yaw rate.

At stage 720, the method 700 includes determining a yaw rate sensor bias estimate for the yaw rate sensor based on at least one of the plurality of measurements of yaw rate in response to: a plurality of indications of location of the vehicle over time based on global navigation satellite system signals being indicative of straight-line movement of the vehicle; or a determination that the vehicle is stationary. For example, the straight driving detection unit 420 may use GNSS locations of the inputs 425 to determine that the vehicle 300 can be considered to be driving straight (e.g., driving straight or within an acceptable threshold of driving straight), and this determination may trigger yaw rate sensor bias estimating by the bias estimator 430. As another example, the standstill detection unit 410 may use the inputs 415 to determine that the vehicle 300 can be considered stationary (e.g., stationary or within an acceptable threshold of being stationary), and this determination may trigger yaw rate sensor bias estimating by the bias estimator 430. The bias estimator 430 may determine a yaw rate sensor bias estimate based on the input 435 in response to one or more indications of zero true yaw rate from the standstill detection unit 410 or the straight driving detection unit 420. The processor 310, possibly in combination with the memory 320, may comprise means for determining the yaw rate sensor bias estimate.

Implementations of the method 700 may include one or more of the following features. In an example implementation, the yaw rate sensor bias estimate for the yaw rate sensor is determined further in response to at least one of the plurality of measurements of yaw rate being indicative of straight-line movement of the vehicle. For example, the straight driving detection unit 420 may use raw yaw rate of the inputs 425 to determine that the vehicle 300 can be considered to be driving straight (e.g., driving straight or within an acceptable threshold of driving straight), and this determination may be used to trigger yaw rate sensor bias estimating by the bias estimator 430. In a further example implementation, determining the yaw rate sensor bias estimate for the yaw rate sensor comprises determining that yaw rate measurement residuals are below one or more respective residual thresholds. For example, the bias estimator 430 may determine the yaw rate bias estimate indication 432 based on the check sensor agreement unit 520 determining that residuals of the raw yaw rate and GNSS virtual zero yaw rate in the inputs 525 are below a residual threshold (such that the check sensor agreement unit 520 determines that sensors agree that the vehicle 300 may be considered to be driving straight).

Also or alternatively, implementations of the method 700 may include one or more of the following features. In an example implementation, the method 700 includes providing a yaw rate indication that comprises at least one of the plurality of measurements of yaw rate with the yaw rate sensor bias estimate removed. For example, the bias estimate removal unit 440 may provide the yaw rate estimate 442 e.g., to the yaw rate application(s) 360. The processor 310, possibly in combination with the memory 320, may comprise means for providing the yaw rate indication. In another example implementation, the vehicle is an autonomous vehicle and the yaw rate related method further comprises disabling a blind stop function of the vehicle based on a yaw rate sensor bias estimate covariance exceeding an accuracy threshold. For example, the readiness unit 460 may provide the readiness indicator 462 to an autonomous movement-assistance system (e.g., an ADAS of an automobile) of the yaw rate application(s) 360 indicating that the yaw rate bias estimate is not ready in order to disable blind stopping of the vehicle 300. The processor 310, possibly in combination with the memory 320, may comprise means for disabling the blind stop function. In a further example implementation, the method 700 includes determining the accuracy threshold based on a speed of the autonomous vehicle. For example, the processor 310 may determine the accuracy threshold such that the threshold is smaller for faster vehicle speeds. The processor 310, possibly in combination with the memory 320, in combination with one or more of the sensor(s) 213 (e.g., a speed sensor) may comprise means for determining the accuracy threshold.

Also or alternatively, implementations of the method 700 may include one or more of the following features. In an example implementation, the method 700 includes determining that the plurality of indications of location of the vehicle are indicative of straight-line movement of the vehicle by determining that a ratio of orthogonal standard deviations of the plurality of indications of location of the vehicle is less than a straight-line threshold. For example, the PCA unit 510 may determine that the vehicle 300 is driving straight based on the axis ratio, determined according to Equation (3), is below a threshold axis ratio. The processor 310, possibly in combination with the memory 320, in combination with one or more of the sensor(s) 213 (e.g., a speed sensor) and/or the GNSS receiver 340 may comprise means for determining that the plurality of indications of location of the vehicle are indicative of straight-line movement of the vehicle.

Experimental Results

Experiments have shown that using GNSS input to determine straight-line movement and to trigger updating of an estimated yaw rate sensor bias may reduce error in the estimated yaw rate sensor bias compared to updating the yaw rate sensor bias based on yaw rate indicated by a yaw rate sensor being within a range of values near zero true yaw rate. Further, experiments have shown that updating the estimated yaw rate sensor bias in response to agreement between yaw rate sensor measurements and GNSS sensor measurements may improve accuracy of the estimated yaw rate sensor bias, e.g., avoiding inaccurate updates of the estimated yaw rate sensor bias when changing from straight-line driving to driving on a curve.

Implementation Examples

Implementation examples are provided in the following numbered clauses.

Clause 1. A yaw rate related method comprising:
obtaining a plurality of measurements of yaw rate of a vehicle from a yaw rate sensor; and
determining a yaw rate sensor bias estimate for the yaw rate sensor based on at least one of the plurality of measurements of yaw rate in response to:
a plurality of indications of location of the vehicle over time based on global navigation satellite system signals being indicative of straight-line movement of the vehicle; or
a determination that the vehicle is stationary.

Clause 2. The yaw rate related method of clause 1, wherein the yaw rate sensor bias estimate for the yaw rate sensor is determined further in response to the at least one of the plurality of measurements of yaw rate being indicative of straight-line movement of the vehicle.

Clause 3. The yaw rate related method of clause 2, wherein determining the yaw rate sensor bias estimate for the yaw rate sensor comprises determining that yaw rate measurement residuals are below one or more respective residual thresholds.

Clause 4. The yaw rate related method of clause 1, further comprising providing a yaw rate indication that comprises at least one of the plurality of measurements of yaw rate with the yaw rate sensor bias estimate removed.

Clause 5. The yaw rate related method of clause 1, wherein the vehicle is an autonomous vehicle and the yaw rate related method further comprises disabling a blind stop function of the autonomous vehicle based on a yaw rate sensor bias estimate covariance exceeding an accuracy threshold.

Clause 6. The yaw rate related method of clause 5, further comprising determining the accuracy threshold based on a speed of the autonomous vehicle.

Clause 7. The yaw rate related method of clause 1, further comprising determining that the plurality of indications of location of the vehicle are indicative of straight-line movement of the vehicle by determining that a ratio of orthogonal standard deviations of the plurality of indications of location of the vehicle is less than a straight-line threshold.

Clause 8. A device comprising:
one or more memories; and
one or more processors communicatively coupled to the one or more memories and configured to:
obtain a plurality of measurements of yaw rate of a vehicle from a yaw rate sensor; and
determine a yaw rate sensor bias estimate for the yaw rate sensor based on at least one of the plurality of measurements of yaw rate in response to:
a plurality of indications of location of the vehicle over time based on global navigation satellite system signals being indicative of straight-line movement of the vehicle; or
a determination that the vehicle is stationary.

Clause 9. The device of clause 8, wherein the one or more processors are configured to determine the yaw rate sensor bias estimate for the yaw rate sensor further in response to the at least one of the plurality of measurements of yaw rate being indicative of straight-line movement of the vehicle.

Clause 10. The device of clause 9, wherein to determine the yaw rate sensor bias estimate for the yaw rate sensor the one or more processors are configured to determine that yaw rate measurement residuals are below a residual threshold.

Clause 11. The device of clause 8, wherein the one or more processors are configured to provide a yaw rate indication that comprises at least one of the plurality of measurements of yaw rate with the yaw rate sensor bias estimate removed.

Clause 12. The device of clause 8, wherein the vehicle is an autonomous vehicle and the one or more processors are further configured to disable a blind stop function of the autonomous vehicle based on a yaw rate sensor bias estimate covariance exceeding an accuracy threshold.

Clause 13. The device of clause 12, wherein the one or more processors are configured to determine the accuracy threshold based on a speed of the autonomous vehicle.

Clause 14. The device of clause 8, wherein the one or more processors are configured to determine that the plurality of indications of location of the vehicle are indicative of straight-line movement of the vehicle by determining that a ratio of orthogonal standard deviations of the plurality of indications of location of the vehicle is less than a straight-line threshold.

Clause 15. A device comprising:
means for obtaining a plurality of measurements of yaw rate of a vehicle from a yaw rate sensor; and means for determining a yaw rate sensor bias estimate for the yaw rate sensor based on at least one of the plurality of measurements of yaw rate in response to:
  a plurality of indications of location of the vehicle over time based on global navigation satellite system signals being indicative of straight-line movement of the vehicle; or
  a determination that the vehicle is stationary.

Clause 16. The device of clause 15, wherein the means for determining the yaw rate sensor bias estimate for the yaw rate sensor comprise means for determining the yaw rate sensor bias estimate for the yaw rate sensor further in response to the at least one of the plurality of measurements of yaw rate being indicative of straight-line movement of the vehicle.

Clause 17. The device of clause 16, wherein the means for determining the yaw rate sensor bias estimate for the yaw rate sensor comprise means for determining that yaw rate measurement residuals are below a residual threshold.

Clause 18. The device of clause 15, further comprising means for providing a yaw rate indication that comprises at least one of the plurality of measurements of yaw rate with the yaw rate sensor bias estimate removed.

Clause 19. The device of clause 15, wherein the vehicle is an autonomous vehicle and the device further comprises means for disabling a blind stop function of the autonomous vehicle based on a yaw rate sensor bias estimate covariance exceeding an accuracy threshold.

Clause 20. The device of clause 19, further comprising means for determining the accuracy threshold based on a speed of the autonomous vehicle.

Clause 21. The device of clause 15, further comprising means for determining that the plurality of indications of location of the vehicle are indicative of straight-line movement of the vehicle by determining that a ratio of orthogonal standard deviations of the plurality of indications of location of the vehicle is less than a straight-line threshold.

Clause 22. A non-transitory, processor-readable storage medium comprising processor-readable instructions to cause one or more processors to:
  obtain a plurality of measurements of yaw rate of a vehicle from a yaw rate sensor; and
  determine a yaw rate sensor bias estimate for the yaw rate sensor based on at least one of the plurality of measurements of yaw rate in response to:
    a plurality of indications of location of the vehicle over time based on global navigation satellite system signals being indicative of straight-line movement of the vehicle; or
    a determination that the vehicle is stationary.

Clause 23. The non-transitory, processor-readable storage medium of clause 22, wherein the processor-readable instructions to cause the one or more processors to determine the yaw rate sensor bias estimate for the yaw rate sensor comprise processor-readable instructions to cause the one or more processors to determine the yaw rate sensor bias estimate for the yaw rate sensor further in response to the at least one of the plurality of measurements of yaw rate being indication of straight-line movement of the vehicle.

Clause 24. The non-transitory, processor-readable storage medium of clause 23, wherein the processor-readable instructions to cause the one or more processors to determine the yaw rate sensor bias estimate for the yaw rate sensor comprise processor-readable instructions to cause the one or more processors to determine that yaw rate measurement residuals are below a residual threshold.

Clause 25. The non-transitory, processor-readable storage medium of clause 22, further comprising processor-readable instructions to cause the one or more processors to provide a yaw rate indication that comprises at least one of the plurality of measurements of yaw rate with the yaw rate sensor bias estimate removed.

Clause 26. The non-transitory, processor-readable storage medium of clause 22, wherein the vehicle is an autonomous vehicle and the non-transitory, processor-readable storage medium further comprises processor-readable instructions to cause the one or more processors to disable a blind stop function of the autonomous vehicle based on a yaw rate sensor bias estimate covariance exceeding an accuracy threshold.

Clause 27. The non-transitory, processor-readable storage medium of clause 26, further comprising processor-readable instructions to cause the one or more processors to determine the accuracy threshold based on a speed of the autonomous vehicle.

Clause 28. The non-transitory, processor-readable storage medium of clause 22, further comprising processor-readable instructions to cause the one or more processors to determine that the plurality of indications of location of the vehicle are indicative of straight-line movement of the vehicle by determining that a ratio of orthogonal standard deviations of the plurality of indications of location of the vehicle is less than a straight-line threshold.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A yaw rate related method comprising:
    obtaining a plurality of measurements of yaw rate of a vehicle from a yaw rate sensor; and
    determining a yaw rate sensor bias estimate for the yaw rate sensor based on at least a first one of the plurality of measurements of yaw rate in response to:
        a plurality of indications of location of the vehicle over time based on global navigation satellite system signals being indicative of straight-line movement of the vehicle and at least a second one of the plurality of measurements of yaw rate being indicative of straight-line movement of the vehicle.

2. The yaw rate related method of claim 1, wherein determining the yaw rate sensor bias estimate for the yaw rate sensor comprises determining that yaw rate measurement residuals are below one or more respective residual thresholds.

3. The yaw rate related method of claim 1, further comprising providing a yaw rate indication that comprises at least one of the at least a first one of the plurality of measurements of yaw rate with the yaw rate sensor bias estimate removed.

4. The yaw rate related method of claim 1, wherein the vehicle is an autonomous vehicle and the yaw rate related method further comprises disabling a blind stop function of the autonomous vehicle based on a yaw rate sensor bias estimate covariance exceeding an accuracy threshold.

5. The yaw rate related method of claim 4, further comprising determining the accuracy threshold based on a speed of the autonomous vehicle.

6. The yaw rate related method of claim 1, further comprising determining that the plurality of indications of location of the vehicle are indicative of straight-line movement of the vehicle by determining that a ratio of orthogonal standard deviations of the plurality of indications of location of the vehicle is less than a straight-line threshold.

7. A device comprising:
one or more memories; and
one or more processors communicatively coupled to the one or more memories and configured to:
obtain a plurality of measurements of yaw rate of a vehicle from a yaw rate sensor; and
determine a yaw rate sensor bias estimate for the yaw rate sensor based on at least a first one of the plurality of measurements of yaw rate in response to:
a plurality of indications of location of the vehicle over time based on global navigation satellite system signals being indicative of straight-line movement of the vehicle and at least a second one of the plurality of measurements of yaw rate being indicative of straight-line movement of the vehicle.

8. The device of claim 7, wherein to determine the yaw rate sensor bias estimate for the yaw rate sensor the one or more processors are configured to determine that yaw rate measurement residuals are below a residual threshold.

9. The device of claim 7, wherein the one or more processors are configured to provide a yaw rate indication that comprises at least one of the at least a first one of the plurality of measurements of yaw rate with the yaw rate sensor bias estimate removed.

10. The device of claim 7, wherein the vehicle is an autonomous vehicle and the one or more processors are further configured to disable a blind stop function of the autonomous vehicle based on a yaw rate sensor bias estimate covariance exceeding an accuracy threshold.

11. The device of claim 10, wherein the one or more processors are configured to determine the accuracy threshold based on a speed of the autonomous vehicle.

12. The device of claim 7, wherein the one or more processors are configured to determine that the plurality of indications of location of the vehicle are indicative of straight-line movement of the vehicle by determining that a ratio of orthogonal standard deviations of the plurality of indications of location of the vehicle is less than a straight-line threshold.

13. A device comprising:
a yaw rate sensor configured to provide a plurality of measurements of yaw rate of a vehicle; and
means for determining a yaw rate sensor bias estimate for the yaw rate sensor based on at least a first one of the plurality of measurements of yaw rate in response to:
a plurality of indications of location of the vehicle over time based on global navigation satellite system signals being indicative of straight-line movement of the vehicle and at least a second one of the plurality of measurements of yaw rate being indicative of straight-line movement of the vehicle.

14. The device of claim 12, wherein the means for determining the yaw rate sensor bias estimate for the yaw rate sensor comprise means for determining that yaw rate measurement residuals are below a residual threshold.

15. The device of claim 13, further comprising means for providing a yaw rate indication that comprises at least one of the at least a first one of the plurality of measurements of yaw rate with the yaw rate sensor bias estimate removed.

16. The device of claim 13, wherein the vehicle is an autonomous vehicle and the device further comprises means for disabling a blind stop function of the autonomous vehicle based on a yaw rate sensor bias estimate covariance exceeding an accuracy threshold.

17. The device of claim 16, further comprising means for determining the accuracy threshold based on a speed of the autonomous vehicle.

18. The device of claim 13, further comprising means for determining that the plurality of indications of location of the vehicle are indicative of straight-line movement of the vehicle by determining that a ratio of orthogonal standard deviations of the plurality of indications of location of the vehicle is less than a straight-line threshold.

19. A non-transitory, processor-readable storage medium comprising processor-readable instructions to cause one or more processors to:
obtain a plurality of measurements of yaw rate of a vehicle from a yaw rate sensor; and
determine a yaw rate sensor bias estimate for the yaw rate sensor based on at least a first one of the plurality of measurements of yaw rate in response to:
a plurality of indications of location of the vehicle over time based on global navigation satellite system signals being indicative of straight-line movement of the vehicle and at least a second one of the plurality of measurements of yaw rate being indicative of straight-line movement of the vehicle.

20. The non-transitory, processor-readable storage medium of claim 19, wherein the processor-readable instructions to cause the one or more processors to determine the yaw rate sensor bias estimate for the yaw rate sensor comprise processor-readable instructions to cause the one or more processors to determine that yaw rate measurement residuals are below a residual threshold.

21. The non-transitory, processor-readable storage medium of claim 19, further comprising processor-readable instructions to cause the one or more processors to provide a yaw rate indication that comprises at least one of the at least a first one of the plurality of measurements of yaw rate with the yaw rate sensor bias estimate removed.

22. The non-transitory, processor-readable storage medium of claim 19, wherein the vehicle is an autonomous vehicle and the non-transitory, processor-readable storage medium further comprises processor-readable instructions to cause the one or more processors to disable a blind stop function of the autonomous vehicle based on a yaw rate sensor bias estimate covariance exceeding an accuracy threshold.

23. The non-transitory, processor-readable storage medium of claim 22, further comprising processor-readable instructions to cause the one or more processors to determine the accuracy threshold based on a speed of the autonomous vehicle.

24. The non-transitory, processor-readable storage medium of claim 19, further comprising processor-readable instructions to cause the one or more processors to determine that the plurality of indications of location of the vehicle are indicative of straight-line movement of the vehicle by determining that a ratio of orthogonal standard deviations of the plurality of indications of location of the vehicle is less than a straight-line threshold.

* * * * *